Oct. 25, 1966   E. L. STEVENS   3,280,998
MOBILE PICK-UP AND STACKING DEVICE FOR FRUIT BOXES
Filed July 14, 1964   6 Sheets-Sheet 1
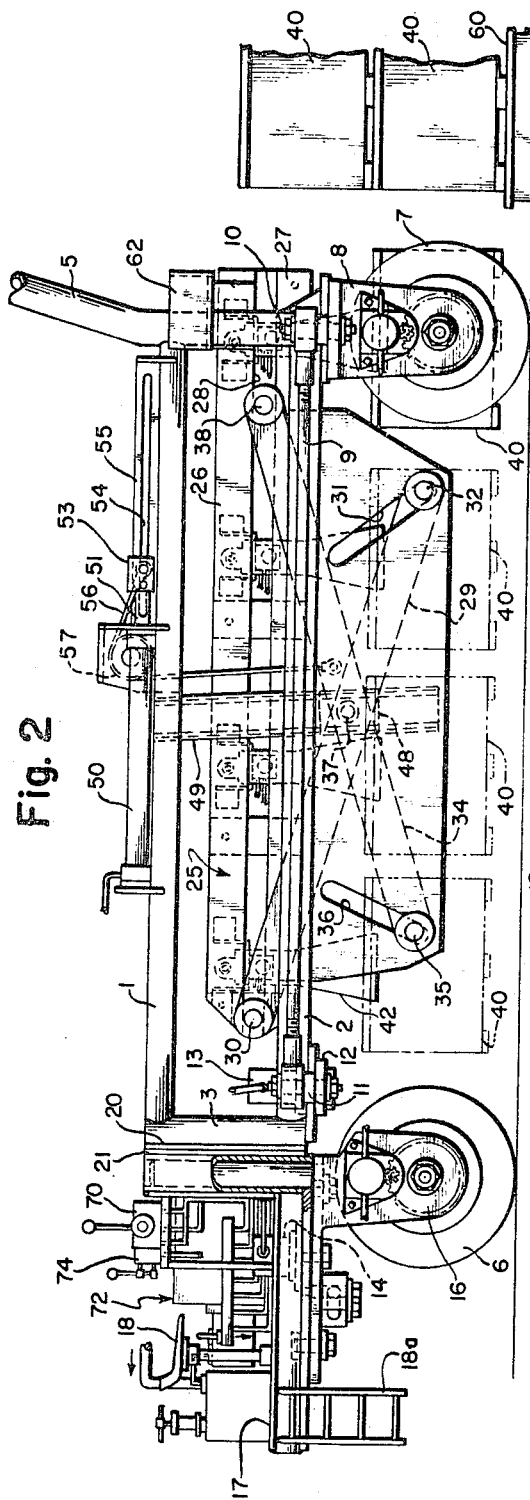
INVENTOR
EDGAR L. STEVENS
BY James H. Ogle
ATTORNEY Oct. 25, 1966 E. L. STEVENS 3,280,998
MOBILE PICK-UP AND STACKING DEVICE FOR FRUIT BOXES
Filed July 14, 1964 6 Sheets-Sheet 2
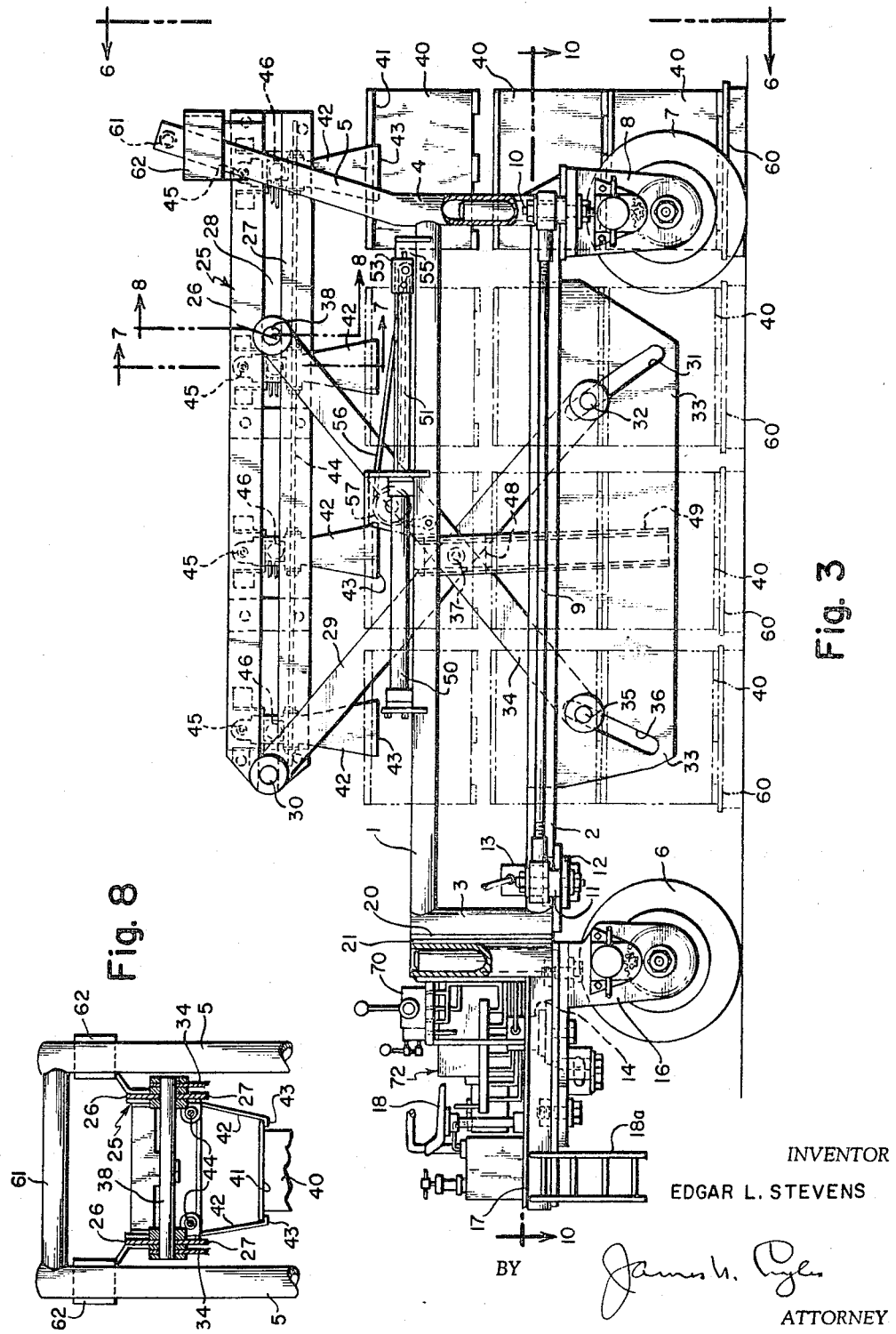
INVENTOR
EDGAR L. STEVENS
BY
ATTORNEY

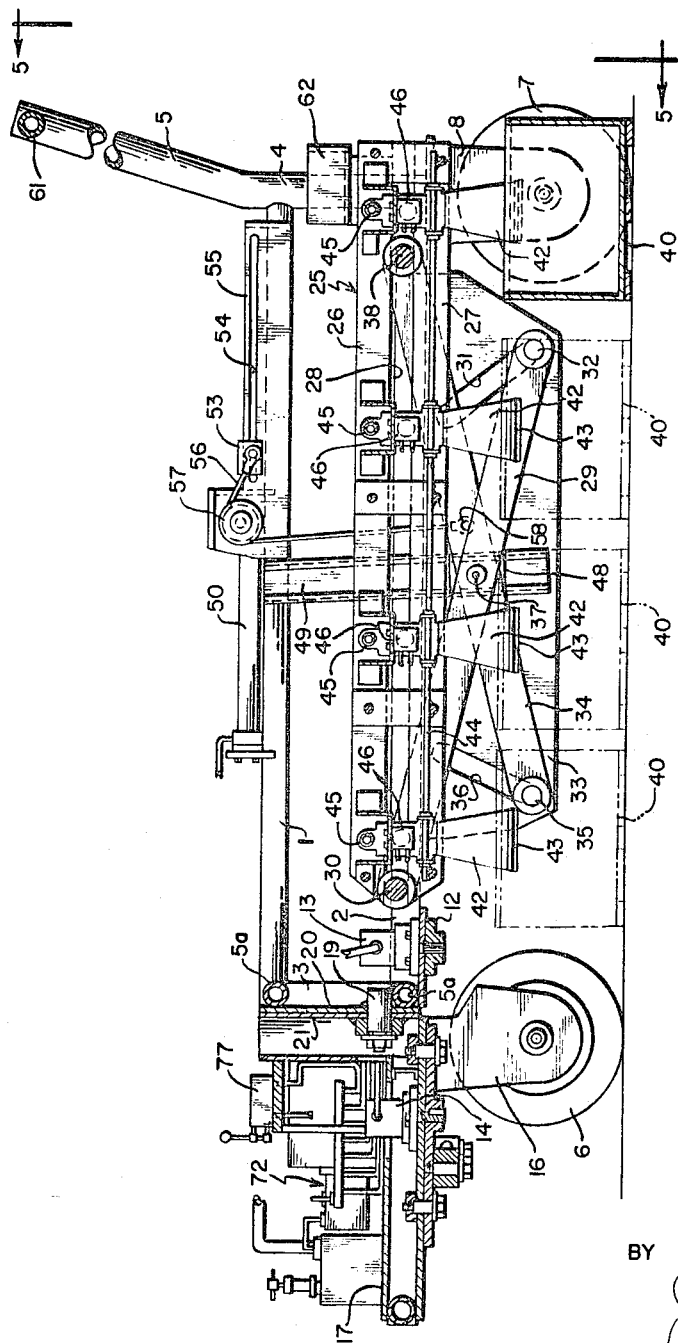

Oct. 25, 1966  E. L. STEVENS  3,280,998
MOBILE PICK-UP AND STACKING DEVICE FOR FRUIT BOXES
Filed July 14, 1964  6 Sheets-Sheet 4

INVENTOR
EDGAR L. STEVENS
BY
*James W. Ogen*
ATTORNEY

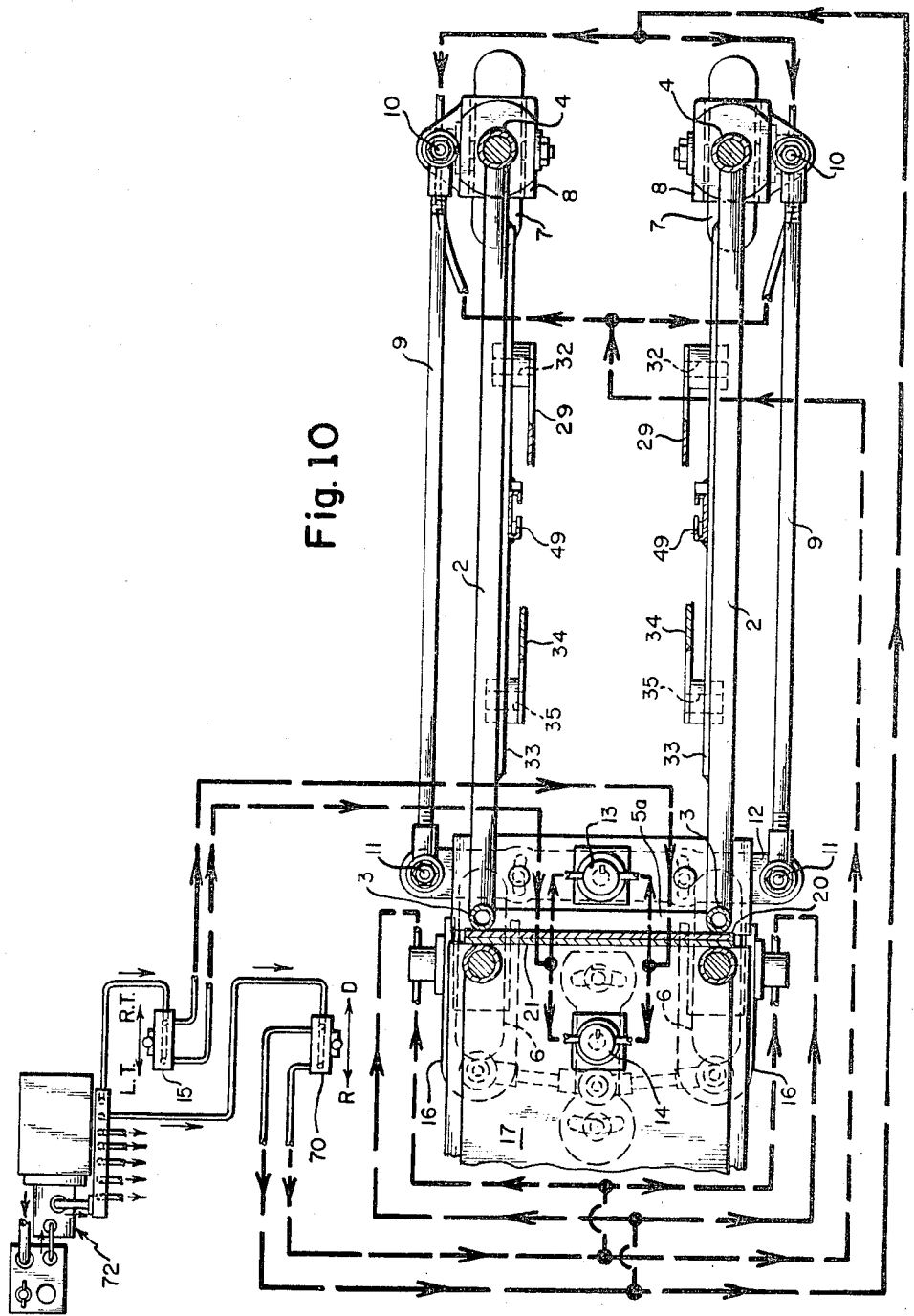

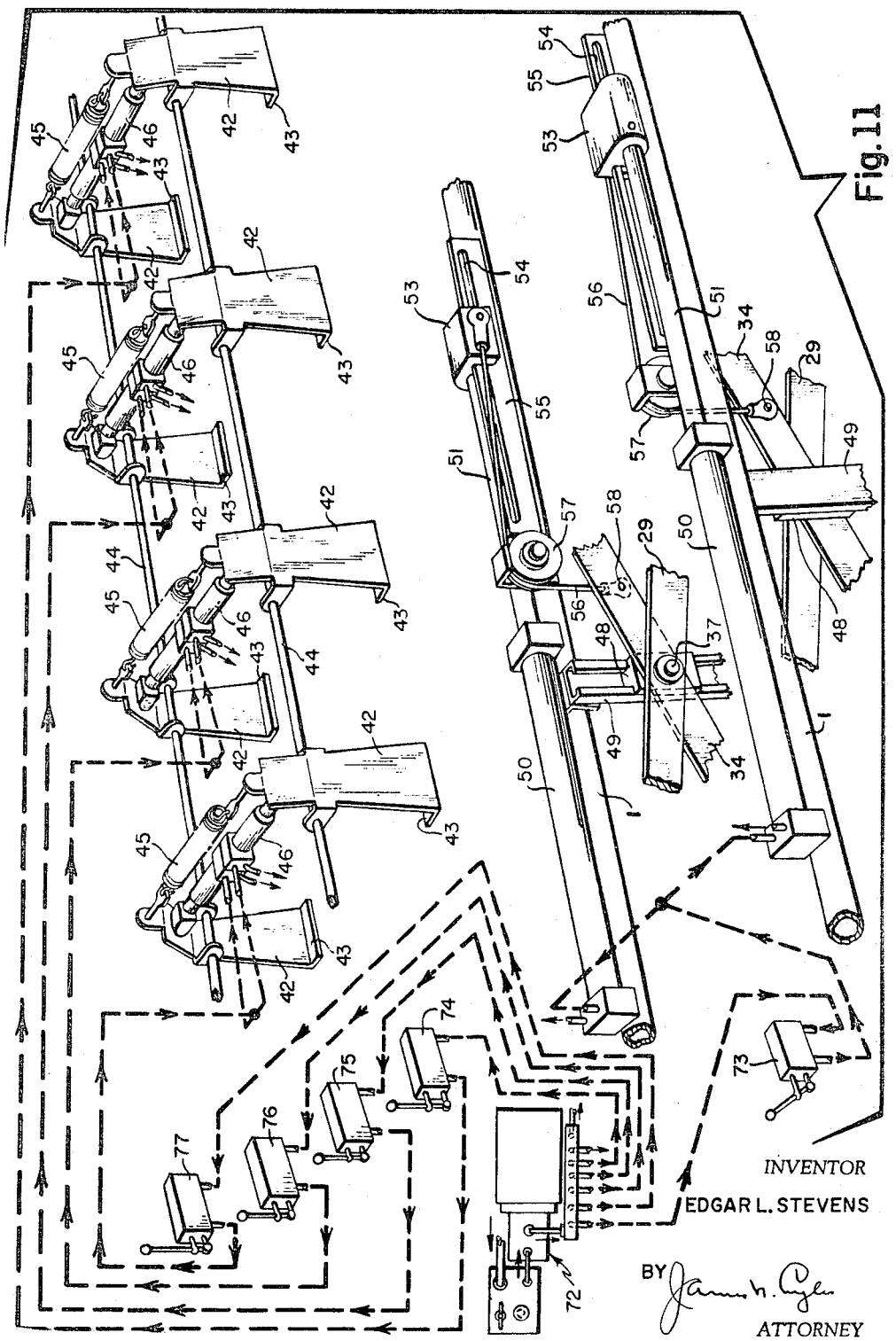

United States Patent Office 3,280,998
Patented Oct. 25, 1966

3,280,998
MOBILE PICK-UP AND STACKING DEVICE
FOR FRUIT BOXES
Edgar L. Stevens, 836 17th Ave., Vero Beach, Fla.
Filed July 14, 1964, Ser. No. 382,575
5 Claims. (Cl. 214—392)

This invention relates to a mobile apparatus for lifting and stacking relatively heavy, loaded boxes or crates such as, for example, the boxes used for containing citrus fruits in orange groves.

It is an object of the invention to provide an apparatus in the form of a wheeled vehicle which can be hydraulically operated and particularly in the narrow lanes or spaces between the rows of trees in a grove or orchard; which will lift the fruit-loaded boxes and stack them, and which can be readily controlled and operated by a single operator.

More particularly, the invention contemplates a wheeled vehicle having a forward part or elevating apparatus shaped to enable it to be driven over and straddle the boxes to be picked up and stacked, there being included in such forward part of the vehicle a pick-up means or elevator in the form of a framework and means for raising and lowering it, such framework including pivoted pick-up jaws. Hydraulic means is used for urging the jaws in a direction toward one another to cause them to grip the boxes between them so that when the framework carrying the jaws is elevated, the boxes will be lifted and can be stacked one upon another.

The invention contemplates the provision of hydraulic means for driving the vehicle either forward or reversely; for steering the front and rear wheels of the vehicle separately; for raising and lowering the box pick-up framework and for closing the gripping jaws thereof. All of these activities are under the control of an operator seated upon a platform or in a cab on the vehicle.

The invention further contemplates the arrangement of a horizontal pivotal connection between the forward part of the vehicle and the rear or cab portion and by means of which the operator and the controls can tilt in respect to the elevating apparatus so that when passing over inequalities in the road the elevating apparatus will remain on an even keel.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a top plan view of a mobile apparatus for picking up and stacking boxes, constructed according to the present invention;

FIG. 2 is a side elevational view of the same;

FIG. 3 is a side elevational view similar to FIG. 2, with the box-elevating means in its raised position;

FIG. 4 is a sectional view taken substantially on the line 4—4 of FIG. 1, looking in the direction of the arrows;

FIG. 8 is a sectional view taken substantially on the line 8—8 of FIG. 3, looking in the direction of the arrows;

FIG. 10 is a section taken on line 10—10 of FIG. 3, and

Figure 5:
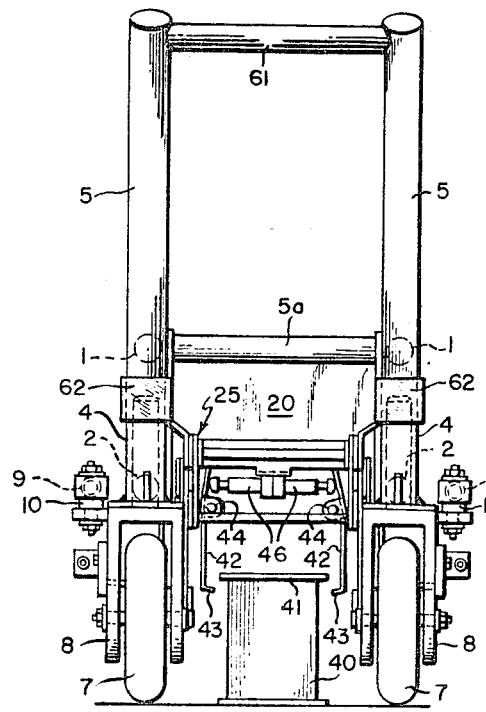
FIG. 5 is a view taken on the line 5—5 of FIG. 4, looking in the direction of the arrows.

FIG. 11 diagrammatically shows the hydraulic controls for the box elevator and the box-gripping means carried thereby.

Referring to the drawings, there is shown therein a vehicle frame which includes upper and lower longitudinal side members 1 and 2 of tubular form, connected at one end of the vehicle by the vertical, tubular posts 3 and also by an end wall 20, and connected at the opposite end by the longer vertical posts 4, the latter posts 4 having upwardly inclined extensions 5. The frame parts 1 and 2 are connected at the rear by tubular cross members 5a. The frame of the vehicle is supported by hydraulically-driven ground wheels, the one pair thereof constituting the rear wheels being indicated at 6 and the second pair at 7. The front pair of wheels, or those shown at 7, are pivotal for steering purposes. Each of said wheels 7 is rotatively mounted in a fork 8 pivotally attached at 10 to one end of a rod 9. There is one of these rods at each side of the vehicle as seen in FIG. 1 for each of the two front wheels 7, and at their opposite ends these rods are pivoted at 11 to the ends of a pivotally mounted cross bar 12. The pivotal movements of the cross bar 12 and hence the steering movements of the front wheels 7 are controlled by hydraulic means shown in FIG. 10 and which includes the cylinders 13 and 14 controlled by the valves 15 so that negotiation of right and left turns by the vehicle is readily effected.

Figure 9:
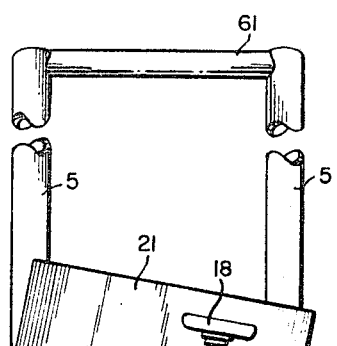
FIG. 9 is a view taken on the line 9—9 of FIG. 1, looking in the direction of the arrows.

The rear wheels 6 of the vehicle are each mounted in a fork 16 and the forks support a platform 17 carrying an operator's seat 18. The various controls for the machine are mounted on or above the platform and steps for mounting the platform are shown at 18a. The rear part of the vehicle, or that part on which the platform is located and which constitutes the so-called "cab," and which includes the wheels 6 and their mountings, is arranged with a horizontal pivot 19 (FIG. 4) which extends through the wall 20 located between the side frames of the vehicle at the rear end of the same, and a similar plate 21 constituting the forward end of the cab or platform. This pivotal arrangement is such that the rear part of the vehicle or that constituting the platform or cab and its supporting wheels 6, is tiltable when passing over inequalities in the ground as is illustrated in FIG. 9, while the box-elevator remains level.

The mechanism for picking up the boxes and stacking them upon one another, includes a framework 25 which has horizontally spaced-apart parallel bars, each frame at each side of the vehicle having an upper horizontal member 26 and a similar lower member 27, said members being joined in a manner to provide an elongated spacing 28 between them. A pivoted link 29 has one end pivotally attached at 30 to one end of the frame arrangement 25, the opposite end of said link having a rod 32 slidably accommodated in an angular slot 31 provided in a plate 33 rigidly fastened to the vehicle frame and extending downwardly therefrom. The rod 32 extends between two of these plates 33, one of which is located at each side of the vehicle frame as seen more clearly in FIG. 10.

Figure 6:
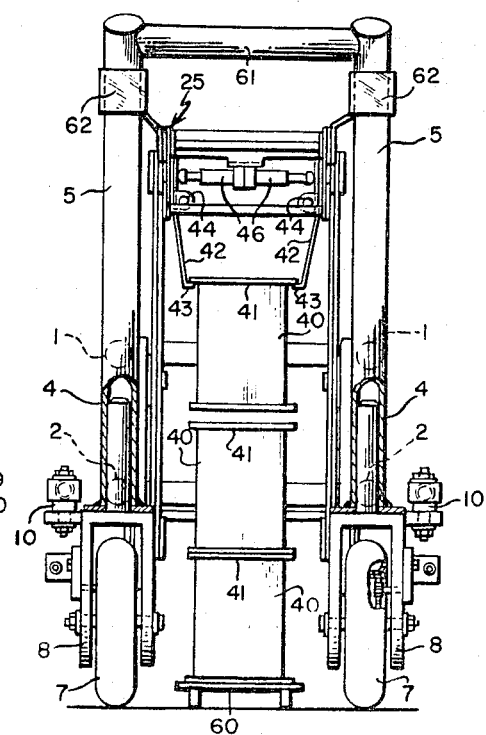
FIG. 6 is a view taken on the line 6—6 of FIG. 3, looking in the direction of the arrows.

A similar link is shown at 34, the same having a rod 35 slidably accommodated in the angular slot 36 in plate 33. The opposite end of the link 34 is provided with a roller 38 slidably guided in the spacing or slot 28 of the frame arrangement 25. The two links 29 and 34 cross one another and at their point of crossing they are pivotally connected by the pivot pin 37. This is clearly shown in FIG. 11. The pivot pin 37 is attached to a guide block 48 slidable in a vertical channel-shaped guide 49 secured to the top member 1 of the frame. This arrangement is such as to provide for a scissoring or lazy-tong effect by which the frames 25 are raised or lowered for the required box pick-up operation. While one of the frames 25 and its associated parts has been described, it will be understood that there are two of these assemblies with one at each side of the machine as will be apparent from FIG. 11, and that the boxes to be lifted by the machine enter between the wheels 7 and are picked up and stacked one upon another in rows as shown in FIG. 6.

Figure 7:
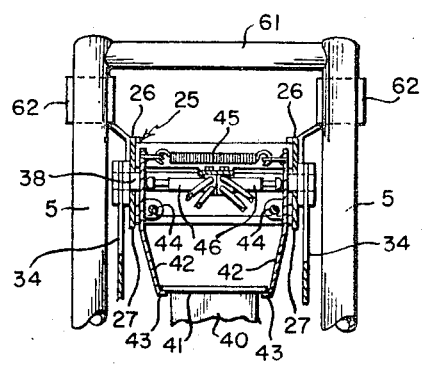
FIG. 7 is a sectional view taken on the line 7—7 of FIG. 3, looking in the direction of the arrows.

As will be seen in FIGS. 5 to 7 inclusive, each of the boxes 40 is provided at the top with a rim 41, and the means for lifting each of the boxes comprising gripping means, consists of pairs of co-operating jaws 42 which are pivotally mounted on and extend below the frames 25. The jaws each terminate in an inturned lip 43 which lips take under the rims of the boxes when the jaws are brought in a direction toward one another. When the frames 25 are then elevated, as in FIGS. 3 and 6, the boxes will be raised accordingly. The jaws 42 are all pivoted as at 44 on a lengthy rod and those in each of the four pairs shown are connected by a coil spring 45 tending to draw the lipped ends of the jaws apart or to open position, as shown in FIG. 5. Hydraulically operated plungers 46 are effective to bring the jaws toward one another when the boxes to be grasped between the jaws and elevated are properly located below the elevating means.

The lifting frames 25 are caused to be elevated when engaged in raising the boxes, by means of hydraulic pistons 51 operating in cylinders 50 (FIG. 11) mounted on top of the upper frame members 1. Attached to each of the pistons 51 is a slide 53 guided by a slot 54 in a guide bracket 55. One end of a cable is attached to the slide, said cable passing over a pulley 57 rotative in the bracket 55 and extending downwardly and being attached at 58 to the link 34. This arrangement is such that when the piston 51 is urged toward the right as viewed in FIG. 4, the slide 53, exerting a pull on the cable 56 will elevate the frames 25 and thus raise the boxes which may then be engaged by the fingers 42. As long as the hydraulic pressure is exerted on the piston 51 the frames 25 and their load will remain elevated and upon release or reduction of the pressure the gravitational descent of the frames and connected linkage will occur. Also, by the means described, the frames and the load of boxes borne by them can be raised to the required height, namely to place one row of the boxes on a pallet 60 or to place a number of the boxes in stacked relation in tiers on top of one another as shown in FIG. 6.

The forward end of the machine is open and the elevated extensions 5 on the posts 4 of the side frames are connected at the top by a tubular cross member 61. Said parts 5 serve as vertical guide members for the frames 25, said frames 25 having projecting guide sleeves 62 fitting around the members 5 and being slidably guided thereon during the raising and lowering movements of the frames 25. This arrangement also provides for a strengthening of the frame structure of the vehicle at its forward end and avoids the possibility of the frame spreading apart on the imposition of heavy loads.

The hydraulic controls for the apparatus are located on and above the platform 17 of the vehicle adjacent to the operator's seat 18, and such controls include valves 70 for the forward and reverse drive of the wheels 7 of the vehicle by hydraulic power as shown in FIG. 10. The control of the steering of the vehicle is done by means of the valve means 15. The controls for operating the raising and lowering of the box-lifting frames 25 and the opening and closing of the jaws 42 thereon, is shown in FIG. 11. The hydraulic fluid supply is shown at 72 and the valve 73 controls the flow of the hydraulic fluid to the cylinders 50 which actuate the pistons 51 to cause the raising of the pick-up frames 25. The four control valves 74, 75, 76 and 77 control the operation of the four pairs of pick-up jaws 42. Thus, by the operation of the selected one or more of the said valves 74 to 77 the required pair or pairs of jaws can be brought into operation to pick up the particular box that is disposed between them.

In the operation of the described apparatus, the vehicle is driven through a fruit grove or orchard between the rows of trees and it progressively picks up the fruit-loaded boxes 40 and stacks them one upon another in rows as shown in FIGS. 3 and 6. The distance of lift of the frames 25 permits, for example, three vertical tiers of the boxes to be placed upon one another. Usually a pallet 60 is placed on the ground between two rows of trees and the machine operator then drives the machine forwardly to straddle the boxes which are to be picked up. At this time the lifting or pick-up frames 25 are lowered to cause the jaws 42 to be positioned along the sides of the boxes. The hydraulic controls 74 to 77 or such of them as may be required to pick up the positioned boxes, are then operated to close the jaws which are located along the sides of such boxes and the jaws will close on the boxes. The frames 25 are then elevated to the required height to raise the first layer of boxes and deposit them on the pallet. This operation is repeated until three vertical and four horizontal rows of the boxes have been stacked on the pallet.

The control of the machine is such that it can be easily guided and manipulated and the heavy fruit-laden boxes easily handled and stacked in the relatively narrow lanes between the fruit trees in a grove or orchard.

Having thus described a single embodiment of the invention, it is obvious that the same is not to be restricted thereto, but is broad enough to cover all structures coming within the scope of the annexed claims.

What I claim is:

1. An apparatus for lifting and stacking boxes comprising, a two-section wheeled vehicle, the sections thereof being coupled together by a horizontally-arranged pivotal connection, one of said sections constituting an operator's platform and containing hydraulic controls, the other section carrying a lifting elevator provided with means for grasping and raising boxes and stacking them one upon the other, said elevator including a plurality of pairs of box-engaging jaws between which the boxes are grasped, said jaws being positioned to enable them to pick up a plurality of boxes located between the wheels of the vehicle, hydraulic means actuated through the hydraulic controls for urging the jaws in each pair toward one another into box-engaging position while said boxes are located between the wheels of the vehicle, and hydraulic means for elevating the elevator to cause the same to raise the boxes engaged by the jaws.

2. In an apparatus as provided for in claim 1, wherein the vehicle is provided with a frame, the elevator consisting of longitudinal bars connected by scissored links to the frame, and hydraulic cylinders having pistons connected to the links by flexible cables to effect the raising of the elevator.

3. An apparatus for lifting and stacking boxes comprising, a vehicle having spaced-apart wheels between which the boxes to be stacked can be positioned, an elevator consisting of spaced apart parallel bars connected by scissored links to the vehicle, hydraulic cylinders operative to raise the elevator, the bars thereof provided with a plurality of sets of pivoted fingers which are spring-biased apart to engage a plurality of boxes simultaneously and lift the same and hydraulic pistons disposed between the bars to urge the sets of fingers toward one another and cause them to simultaneously grasp a number of the boxes between them.

4. A box lifting and stacking apparatus comprising, a vehicle having a pair of side frames, two pairs of wheels carried from the frames, hydraulic means for controlling the steering of two pairs of the wheels, the vehicle including a cab portion and an elevator-carrying portion, the cab being connected to the elevator-carrying portion by a horizontally-arranged pivot, an elevator carried by the elevator-carrying portion, said elevator consisting of spaced, longitudinally extending bars connected by scissored links to the frames, hydraulic means carried by the frames for raising the bars, the bars carrying a plurality of pairs of pivoted jaws, hydraulic means operative between the jaws in each pair to move said jaws toward one another to box-grasping position, and spring means between the jaws in each pair to separate the jaws to box-releasing position.

5. An apparatus as provided for in claim 4, wherein the side frames are tubular, the hydraulic means for raising the bars consisting of pistons slidable longitudinally of the frames and cables extending between the pistons and the scissored links.

References Cited by the Examiner

UNITED STATES PATENTS

| | | | |
|---|---|---|---|
| 1,271,947 | 7/1918 | Ross | 214—392 |
| 2,173,068 | 9/1939 | Schroeder | 280—111 X |
| 2,489,056 | 11/1949 | Stewart | 254—4 X |
| 2,512,409 | 6/1950 | Adde | 214—653 |
| 2,601,933 | 7/1952 | Seagraues et al. | 214—653 |
| 2,982,430 | 5/1961 | Clifton | 214—392 |
| 3,045,848 | 7/1962 | Christenson et al. | 214—392 |
| 3,105,673 | 10/1963 | Williamson. | |
| 3,161,309 | 12/1964 | Baudhuin et al. | 214—392 |

GERALD M. FORLENZA, *Primary Examiner.*

ALBERT J. MAKAY, *Examiner.*